(12) United States Patent
Muchow et al.

(10) Patent No.: US 6,559,661 B1
(45) Date of Patent: May 6, 2003

(54) CIRCUIT CONFIGURATION FOR COMPENSATING THE TEMPERATURE NON-LINEARITY OF THE CHARACTERISTIC CURVES OF THE PIEZORESISTIVE MEASURING RESISTORS CONNECTED IN A BRIDGE CIRCUIT

(75) Inventors: Joerg Muchow, Pliezhausen (DE); Joachim Horn, Reutlingen (DE); Oliver Schatz, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/830,262

(22) PCT Filed: Jul. 17, 1999

(86) PCT No.: PCT/DE99/02217

§ 371 (c)(1),
(2), (4) Date: Jul. 18, 2001

(87) PCT Pub. No.: WO00/23777

PCT Pub. Date: Apr. 27, 2000

(30) Foreign Application Priority Data

Oct. 21, 1998 (DE) .......................................... 198 48 362

(51) Int. Cl.$^7$ ............................................... G01R 17/02
(52) U.S. Cl. ........................ 324/725; 73/766; 323/907
(58) Field of Search .................... 73/766, 765; 324/725, 324/431, 684, 685, 105, DIG. 1; 323/907

(56) References Cited

U.S. PATENT DOCUMENTS

| 3,046,782 A | 7/1962 | Laimins ........................ 73/708 |
| 4,173,148 A | 11/1979 | Yamada et al. ............... 73/766 |
| 5,522,266 A | 6/1996 | Nicholson et al. ..... 73/862.623 |

FOREIGN PATENT DOCUMENTS

| DE | 28 39 617 | 3/1980 |

*Primary Examiner*—N. Le
*Assistant Examiner*—Vincent Q. Nguyen
(74) *Attorney, Agent, or Firm*—Kenyon & Kenyon

(57) ABSTRACT

A circuit arrangement is described for compensating temperature non-linearity of the characteristics of piezoresistive, metallic or polycrystalline resistors (bridge resistors) connected in a bridge circuit, the non-linearities being caused by non-linearities of the resistors, in particular due to the physical quantities affecting the bridge circuit (temperature, pressure, bimetal effects, non-linear membrane stresses), and the resistors being composed of partial resistors having different temperature coefficients, with each of the partial resistors having a certain linear and non-linear temperature response. The partial resistors of each bridge resistor are selected on the basis of their known linear and non-linear temperature characteristics so that an asymmetric layout of the bridge circuit is obtained and a non-linear variation of a bridge output voltage of the circuit arrangement can be essentially compensated.

19 Claims, 3 Drawing Sheets

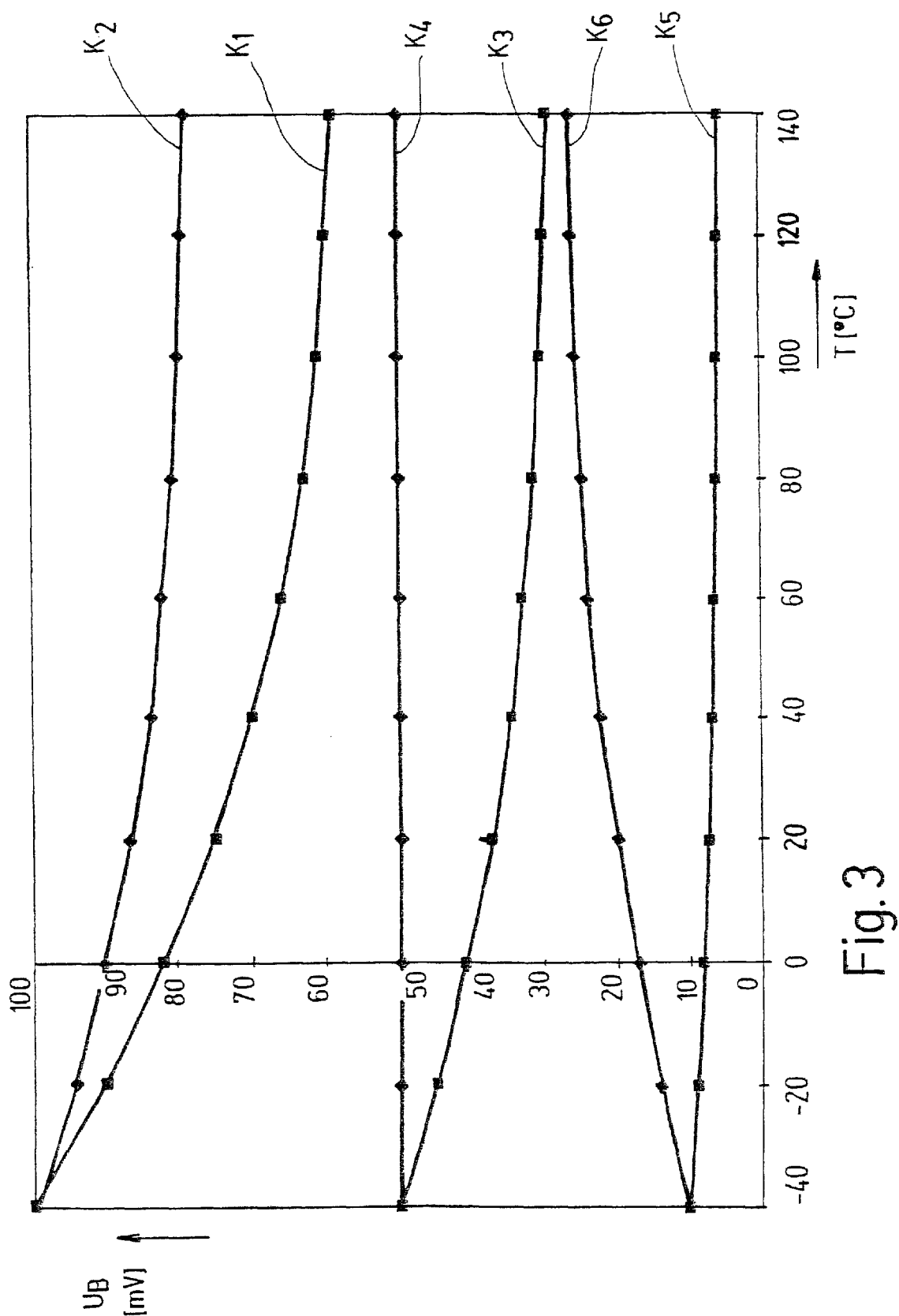

CIRCUIT CONFIGURATION FOR COMPENSATING THE TEMPERATURE NON-LINEARITY OF THE CHARACTERISTIC CURVES OF THE PIEZORESISTIVE MEASURING RESISTORS CONNECTED IN A BRIDGE CIRCUIT

FIELD OF THE INVENTION

The present invention relates to a circuit arrangement for selectively reducing or compensating for the temperature non-linearity of the characteristics of piezoresistive measuring resistors which are connected in a bridge circuit.

BACKGROUND INFORMATION

It is known, for example, when measuring pressures, that micromechanical pressure sensors having a measuring membrane made of a piezoresistive material can be used. In order to obtain an output signal of the pressure sensor, it is known that the measuring membrane can be provided with piezoresistive resistors connected in a bridge circuit (Wheatstone bridge), through which a pressure applied to the measuring membrane can be converted into an electrical output signal.

The bridge resistors are composed of partial resistors which result from the selected design of the pressure sensor. The latter usually has a measuring membrane made of silicon, which is n-doped, for example, into which the actual measuring resistors are applied by diffusion, for example, as p-doped regions (base diffusion). Leads are provided for connecting the measuring resistors. The leads can be designed as a combination of low-resistance diffusion regions and metallic printed conductors. The diffused lead resistor can be formed by $p^+$ doping, for example. The metallic lead resistor may be made of aluminum, for example. The bridge resistors thus each result from the sum of three partial resistors, namely the actual piezoresistive measuring resistor and the diffused and metallic lead resistors. Each of these partial resistors has a different non-linear temperature curve.

SUMMARY OF THE INVENTION

The circuit arrangement according to the present invention offers the advantage over the related art that the temperature non-linearity of the characteristic of a bridge circuit having piezoresistive measuring resistors can be selectively reduced or compensated in a simple manner. Due to the fact that the partial resistors of each bridge resistor are selected, i.e., dimensioned on the basis of their known, non-linear temperature characteristics, well-defined different characteristic curves can be attained for temperature and/or pressure (as a function of mechanical stresses), so that a non-linear temperature characteristic of the pressure transducer due to bimetal effects or non-linearities of the individual resistor elements or a temperature-dependent bridge base voltage, for example, can be compensated. In particular, the non-linear characteristic curve of the individual bridge resistors can be compensated by selecting the ratios of the resistances of the individual partial resistors within the total resistance of the bridge resistors, since in selecting the resistances, the known non-linear temperature and/or pressure response of the individual bridge resistors can be influenced. In particular, the optimum resistances can be determined individually for the partial resistors that are actually subject to a different effect, since the temperature response and/or pressure response have different effects on the individual partial resistors of the bridge resistor.

In a preferred embodiment of the present invention, the resistances of the partial resistors of the bridge resistors are selected so that within a bridge resistor partial resistors having a temperature characteristic with an inverted sign are taken into account. This allows non-linearities occurring as a result of a temperature effect to be compensated even within the bridge resistor, since the partial resistors have a corresponding positive or negative characteristic which are superimposed due to their integration in a bridge resistor.

BRIEF DESCRIPTION OF THE DRAWINGS

FIG. 3 shows different pressure-dependent temperature characteristics of the bridge circuit.

DETAILED DESCRIPTION

Figure 1:
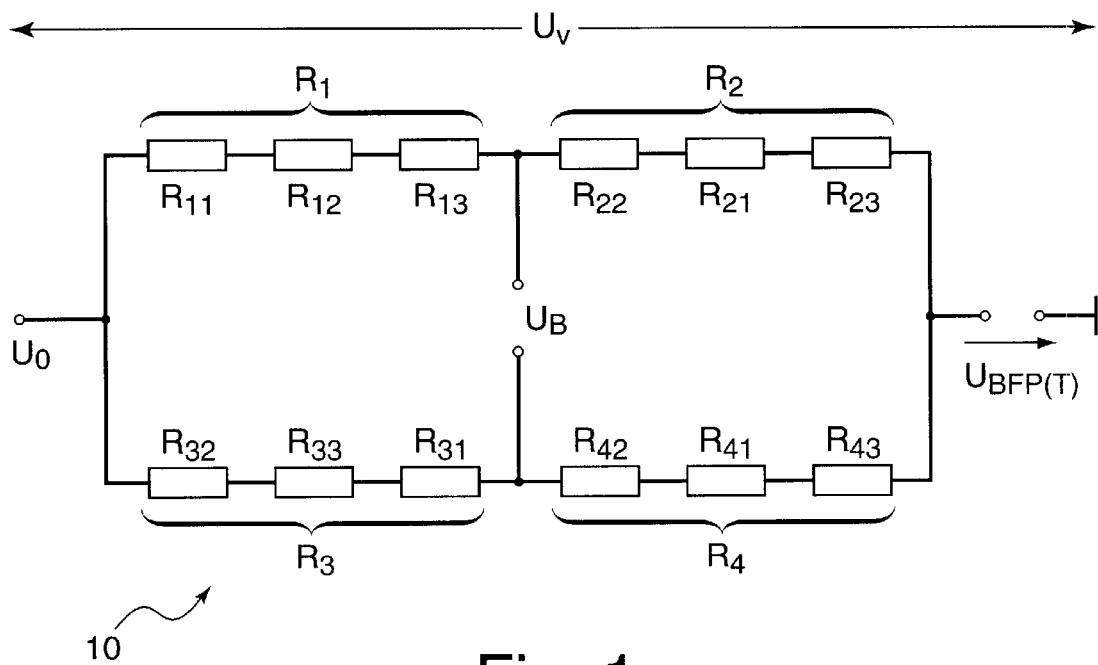
FIG. 1 shows a wiring diagram of a bridge circuit.

FIG. 1 shows a circuit arrangement 10 of a bridge circuit of resistors $R_1$, $R_2$, $R_3$ and $R_4$ (resistors $R_x$ with xx=1, 2, 3, 4). Resistors $R_1$ through $R_4$ are the bridge resistors of a micromechanical pressure sensor, for example. The design and operation of such micromechanical pressure sensors in which circuit arrangement 10 is structured in a silicon membrane or in the edge area of the membrane that can be deflected by the effect of pressure, are generally known, so that they will not be described in detail in the present description.

Each of resistors $R_1$ through $R_4$ is composed of partial resistors $R_{x1}$, $R_{x2}$, and $R_{x3}$, partial resistors $R_{x1}$ being piezoresistive measuring resistors of a resistor region ($p^+$ doped) diffused into the silicon membrane, partial resistors $R_{x2}$ being metallic lead resistors, for example, aluminum conductors, and partial resistors $R_{x3}$ being diffused lead resistors ($p^+$ doped). Thus, for the design of circuit arrangement 10, the following equation applies:

$$R_x = R_{x1} + R_{x2} + R_{x3} (x=1 \text{ through } 4).$$

The voltage equation of circuit arrangement 10 is, as known:

$$U_B = \frac{R_1 \cdot R_4 - R_2 \cdot R_3}{(R_1 + R_2) \cdot (R_3 + R_4)} \cdot U_V,$$

where $U_V$ is the supply voltage and $U_B$ is the bridge voltage of circuit arrangement 10.

Supply voltage $U_V$ is temperature-dependent. This results from the following equation:

$$U_V = U_0 - U_{BFP}(T),$$

where $U_0$ is a bridge supply voltage and $U_{BFP}(T)$ is a temperature-dependent bridge base point voltage. For the bridge base point voltage the following equation applies:

$$U_{BFP}(T) = U_{BFP0} - TK_{BFP} \cdot \Delta T.$$

Wherefrom, for bridge voltage $U_B$:

$$U_B(\Delta T) = \frac{R_1(\Delta T) \cdot R_4(\Delta T) - R_2(\Delta T) \cdot R_3(\Delta T)}{(R_1(\Delta T) + R_2(\Delta T)) \cdot (R_3(\Delta T) + R_4(\Delta T))}$$

$[U_0 - U_{BFP0} + TK_{BFP}\Delta T]$.

$p$=const.

from which, approximately, considering pressure p constant:

$U_B(\Delta T) \approx U_B|\cdot[1 - TK_{Br} \cdot \Delta T]$ $p$=const.

where the term $1 - TK_{BR} \cdot \Delta T$ describes the temperature-dependence of the bridge voltage in linear approximation. Wherefrom:

$$U_B(\Delta T) \approx \underbrace{U_B \mid \cdot (U_0 - U_{BFP0})}_{\pm f(\Delta T)} \cdot \left[1 + \underbrace{\frac{TK_{BFP}}{U_0 - U_{BFP0}} \Delta T}_{a}\right] \cdot \left[1 - \underbrace{TK_{Br}\Delta T}_{b}\right].$$

As a result, because of the equation $[1+\alpha\Delta T]\cdot[1-b\Delta T]=1+[\alpha-b]\Delta T - ab\Delta T^2$ even if a=b and linear approximations are used for $U_{BFP}\Delta t$ and the bridge voltage for a fixed supply voltage, a quadratic term $ab\Delta T^2$ remains, which determines the temperature non-linearity of the bridge voltage $U_B$. This temperature dependence is one of the factors taken into consideration in the discussion that follows on determining the partial resistances of the bridge circuit.

Each of partial resistors $R_{xx}$ has different linear and quadratic temperature coefficients. It is assumed here that all partial resistors $R_{xx}$ are exposed to basically the same ambient temperature at the intended location of use of the pressure sensor having circuit arrangement 10.

Lead resistors $R_{x2}$ and $R_{x3}$ only depend on temperature T, but not on pressure p applied. Thus the following equation applies for the resistances of partial resistors $R_{x2}$ and $R_{x3}$ as a function of the temperature:

$R = R_0(1 + \Delta T \cdot TKR + \Delta T^2 \cdot TKR^2)$, $R_0$ being the basic resistance at $T=T_0$; $\Delta T=T-T_0$, TKR being the linear temperature coefficient and $TKR^2$ being the quadratic temperature coefficient.

The resistance of piezoresistive measuring resistor $R_{x1}$ depends on mechanical stress $\delta_x$ at the location of the measuring resistor and temperature T.

$R_{x1} = f(\delta_x, T)$.

Also in this case it is assumed that all four measuring resistors $R_{x1}$ have the same temperature. Mechanical stress $\delta_x$ at the location of the measuring resistor is in turn a function of pressure p and temperature T, so that:

$\delta_x = \delta_x(p, T)$.

Assuming a linear function of the pressure and an intrinsic mechanical stress $\delta_0$, which is modeled without temperature coefficients for the sake of simplicity, the following equation applies:

$\delta_x = \text{const} \cdot p + \delta_0 = \delta_x(p)$.

The temperature dependence of measuring resistor $R_{x1}$ basically results from the temperature dependence of piezoresistive coupling factor $\pi(T)$. Thus the pressure—and temperature-dependence of the piezoresistive measuring resistors can be expressed, in the simplest case, using the following formula:

$$R_{x1} = R_{x10}\left[1 + \underbrace{[\pi(T) \cdot \delta_x(p)]}_{I} + \underbrace{\frac{TKR_{x1} \cdot \Delta T + TKR_{x1}^2 \cdot \Delta T^2}{II}}\right]$$

Term I describes the change in the resistance due to an applied pressure p on the basis of the temperature-dependent piezoresistive effect. Term II describes the change in the resistance as a function of the temperature.

Figure 2A:
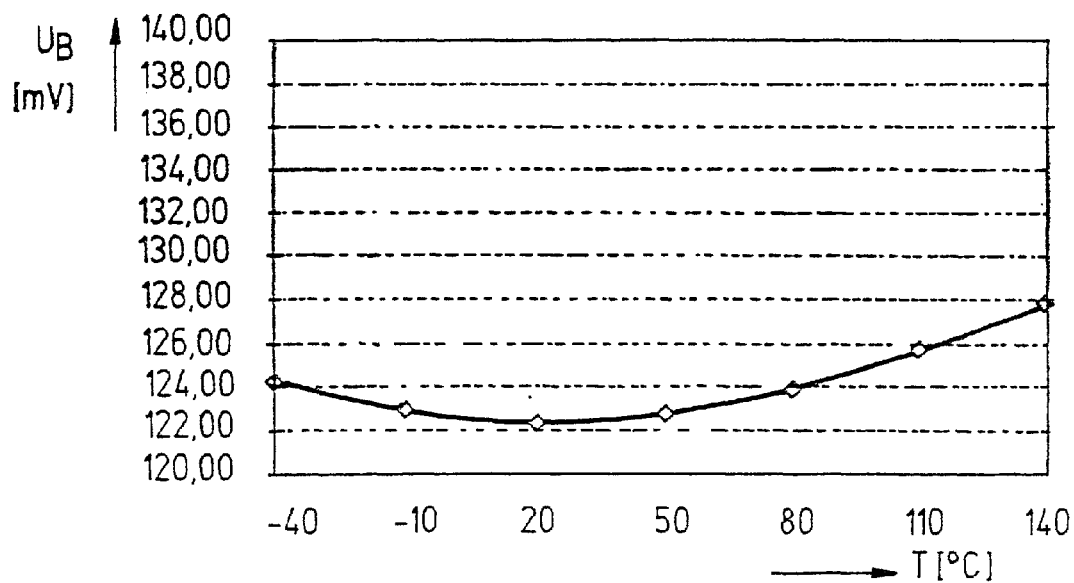
FIG. 2a shows a first illustration of the variation of an output signal of the bridge circuit as a function of the temperature.
Figure 2B:
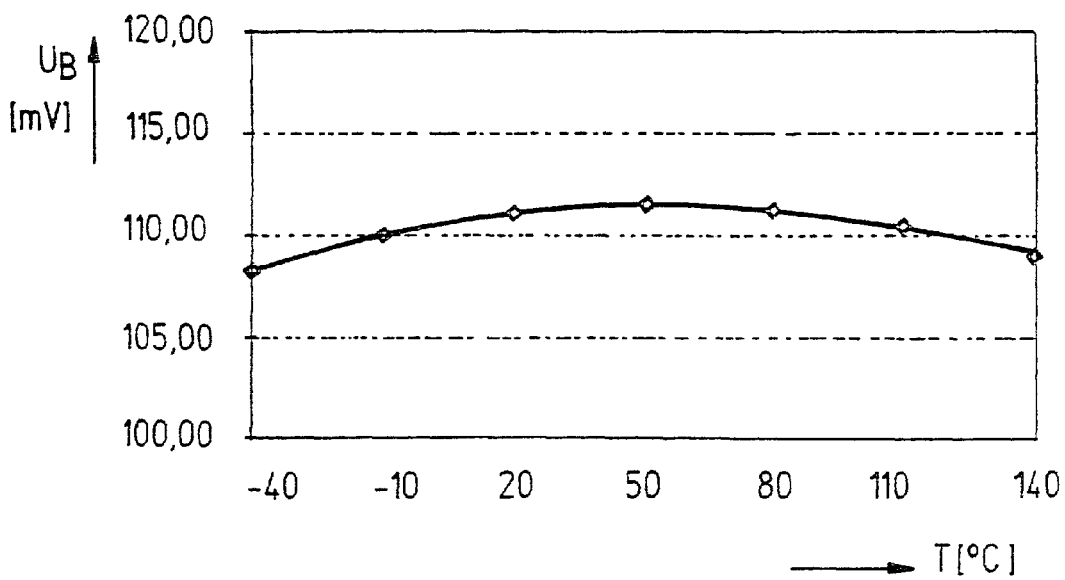
FIG. 2b shows a second illustration of the variation of an output signal of the bridge circuit as a function of the temperature.

FIGS. 2a and 2b show, by way of examples, two characteristics representing the variation of bridge voltage $U_B$ over the temperature for different non-linear characteristic curves. A change in the non-linearity caused by a change in the symmetry of the resistor circuit is illustrated. According to FIG. 2a, the characteristic has a minimum in the temperature range around 2° C., while the characteristic according to FIG. 2b has a maximum in the temperature range of about 50° C. The characteristic curve of bridge voltage $U_B$ over temperature T depends on the different linear and quadratic temperature coefficients of resistors $R_1$ through $R_4$ used in the bridge circuit which, as FIG. 1 shows, are composed of partial resistors $R_{x1}$ through $R_{x3}$. Thus for the variation of the resistance of resistor R over the temperature, the following applies:

$R = R_0(1 + \Delta T \cdot TKR + \Delta T^2 \cdot TKR^2)$, where $R_0$ is the basic resistance, TKR is the linear resistance coefficient, and $TKR^2$ is the quadratic resistance coefficient.

According to this formula, the following can be derived for resistors $R_1$ through $R_4$ of circuit arrangement 10:

$$R_x(T) = R_{x10}\left[1 + \underbrace{[\pi(T) \cdot \delta_x(p)]}_{I} + \underbrace{\frac{TKR_{x1} \cdot \Delta T + TKR_{x1}^2 \cdot \Delta T^2}{II}}\right] +$$

$$R_{x20}(1 + \Delta T \cdot TKR_{x2} + \Delta T^2 \cdot TKR_{x2}^2) +$$

$$R_{x30}(1 + \Delta T \cdot TKR_{x3} + \Delta T^2 \cdot TKR_{x3}^2).$$

It becomes clear that each of the partial resistors $R_{xx}$ affects the non-linear temperature characteristic curve of bridge voltage $U_B$ according to its linear and quadratic temperature coefficients.

In order to compensate the non-linear characteristics of circuit arrangement 10, the resistance of partial resistors $R_{xx}$ are divided so that they have different temperature characteristics. For example, the proportions of partial resistors $R_{x1}$, $R_{x2}$ and $R_{x3}$ within the required total resistance of the individual bridge resistors $R_1$ through $R_4$, are selected relative to one another so that, for example, the resistance of resistor $R_{x1}$ has a positive temperature characteristic and the resistance of resistor $R_{x2}$ has a negative temperature characteristic. Since the linear and quadratic temperature coefficients are different for different orders of magnitude of the resistances, a temperature drift of circuit arrangement 10 can be set to the desired value by varying partial resistors $R_{x1}$ through $R_{x3}$ with a different characteristic curve, without varying the total resistance of bridge resistors $R_1$ through $R_4$. In particular, by integrating partial resistors having positive and negative temperature characteristic curves into total resistors $R_1$ through $R_4$, a temperature drift is compensated in the sum of the resistances, so that no additional active and/or passive circuit components are needed.

Furthermore, by suitably dimensioning partial resistors $R_{xx}$, a piezo effect of circuit arrangement 10 can be compensated in addition to compensating for the non-linear temperature curve. When a mechanical stress (pressure) is applied to the membrane having circuit arrangement 10, the resistances of measuring resistors $R_{x1}$ are affected, while the resistances of lead resistors $R_{x2}$ and $R_{x3}$ remain unaffected. This allows non-linear detuning of bridge voltage $U_B$ via the pressure. This non-linear detuning via the pressure is also superimposed due to the above-described non-linear temperature characteristic curve of partial resistors $R_{xx}$. If partial resistors $R_{xx}$ are selected due to the mechanical stress (pressure) applied according to their known non-linearity so that a well-defined intentional detuning of the circuit arrangement is obtained, non-linearity can be compensated for or at least the maximum non-linearity occurring can be minimized.

FIG. 3 shows, by way of example, pairs of characteristics where bridge voltage $U_B$ is plotted against the temperature and the non-linearities resulting from the mechanical stress. A pressure p is assumed which can be detected by a pressure sensor contained in circuit arrangement 10. An upper pair of characteristics shows the variation for maximum pressure p in one characteristic $K_1$ and the variation of the characteristic in a characteristic $K_2$ in the case of compensation according to the present invention. An additional pair of characteristics shows the variation for half pressure p in one characteristic $K_3$ and characteristic $K_4$ shows the variation of the characteristic compensated according to the present invention. Finally, a third pair of characteristics of characteristic $K_5$ (characteristic for 1/10 pressure p)and a characteristic $K_6$ in the case of compensated non-linearity are shown. It becomes clear that a linear characteristic of bridge voltage $U_B$ over the temperature can be set by selecting the resistances of partial resistors $R_{xx}$ for an assumed average pressure p to be sensed (curve $K_5$).

Of course, the present invention is not restricted to the embodiment shown. Thus, dimensioning of the resistors can also be applied to resistor circuits composed of pure metal conductors (thin metal film). In this case, non-linearities can be produced by doping metal conductors through which temperature non-linearity can be reduced or compensated. Furthermore, resistor circuits implemented using polycrystalline materials are also possible.

Figure 4:
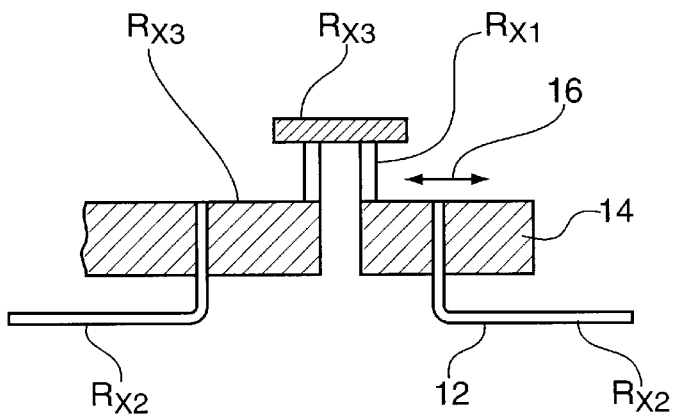
FIG. 4 shows a schematic partial view of a measuring bridge.

FIG. 4 shows a schematic view of the arrangement of partial resistors $R_{x1}$, $RX_2$, and $R_{x3}$. In this case, $R_{x2}$ corresponds to leads 12 to p⁻ doped regions $R_{x1}$, while $R_{x3}$ corresponds to p⁺ doped regions. Leads 12, made of aluminum in particular, which have resistors $R_{x2}$, are contacted with the p⁺ doped substrate. An asymmetric layout of the bridge circuit can be achieved by shifting at least one of the terminals of leads 12 as shown by double arrow 16 in applying the layout. This changes the ratio between the resistances of resistors $R_{x1}$ and $R_{x3}$, i.e., of the p doped regions to the p⁺ doped regions. Terminals 12 can be shifted according to double arrow 16 using photoresist programming.

What is claimed is:

1. A circuit arrangement for compensating for a temperature non-linearity of characteristics of bridge resistors connected in a bridge circuit and including one of piezoresistive resistors, metallic resistors, and polycrystalline resistors, the temperature non-linearity being caused by non-linearities of the bridge resistors due to physical quantities affecting the bridge circuit, and the bridge resistors each including partial resistors having different temperature coefficients, with each of the partial resistors having a linear temperature response and a non-linear temperature response, comprising:

an arrangement for selecting the partial resistors of each bridge resistor on the basis of a known linear temperature characteristic and a known non-linear temperature characteristic of each partial resistor, so that an asymmetric layout of the bridge circuit is obtained and a non-linear characteristic curve of a bridge output voltage of the circuit arrangement can be essentially compensated, wherein:

the partial resistors are arranged in series.

2. The circuit arrangement according to claim 1, wherein:
the physical quantities include at least one of temperature, pressure, bimetal effects, and non-linear membrane stresses.

3. The circuit arrangement according to claim 1, wherein:
resistances of the partial resistors within a total resistance of one of the bridge resistors are dimensioned on the basis of known different temperature curves of the partial resistors of the one of the bridge resistors.

4. The circuit arrangement according to claim 1, wherein:
resistances of the partial resistors are dimensioned so that the partial resistors within one of the bridge resistors have temperature characteristics with different signs.

5. The circuit arrangement according to claim 4, wherein:
at least one of the partial resistors within the one of the bridge resistors has a positive temperature characteristic and at least one of the partial resistors has a negative temperature characteristic.

6. The circuit arrangement according to claim 1, wherein:
the circuit arrangement is integrated in a measuring membrane of a micromechanical pressure sensor.

7. The circuit arrangement according to claim 6, wherein:
the partial resistors are configured to be exposed to an applied mechanical stress, and resistances of the partial resistors are selected so that a known non-linearity of the partial resistors results in a well-defined detuning of the circuit arrangement due to the applied mechanical stress, so that a non-linear variation of the bridge output voltage can be compensated.

8. A circuit arrangement comprising:
a bridge circuit having a plurality of bridge resistors, each of the bridge resistors including a plurality of partial resistors connected in series, the plurality of partial resistors having different temperature coefficients;
wherein the bridge circuit includes an asymmetric layout, and wherein non-linear characteristic curves of output voltages of the individual bridge resistors are essentially compensated for.

9. The circuit arrangement of claim 8, wherein at least one of the partial resistors includes a temperature characteristic with an inverted sign relative to a temperature characteristic of another one of the partial resistors.

10. The circuit arrangement of claim 8, wherein the partial resistors have different linear and quadratic temperature coefficients.

11. The circuit arrangement of claim 8, wherein a resistance of at least one of the partial resistors depends on an applied temperature and does not depend on an applied pressure.

12. The circuit arrangement of claim 8, wherein each of the partial resistors includes one of a piezoresistive measuring resistor, a metallic lead resistor, and a resistor including polycrystalline materials.

13. The circuit arrangement of claim 12, wherein at least one of the partial resistors includes a resistor diffused into a silicon membrane.

14. A method for compensating for a temperature non-linearity of temperature characteristics of a bridge circuit including a plurality of bridge resistors, the bridge circuit including an asymmetric layout, each of the bridge resistors including a plurality of partial resistors connected in series, the plurality of partial resistors having different temperature coefficients, the method comprising:

selecting the partial resistors in accordance with a known linear temperature characteristic and a known non-linear temperature characteristic of each partial resistor, wherein a non-linear characteristic curve of an output voltage of the bridge circuit is essentially eliminated.

15. The method of claim 14, wherein the partial resistors are selected in accordance with ratios of resistances of the partial resistors.

16. The method of claim 14, wherein the partial resistors are selected so that at least one partial resistor includes a temperature characteristic with an inverted sign relative to a temperature characteristic of another one of the partial resistors.

17. The method of claim 14, wherein the partial resistors are selected so that each of the partial resistors includes one of a piezoresistive measuring resistor, a metallic lead resistor, and a resistor including polycrystalline materials.

18. The method of claim 14, wherein the partial resistors are selected to have different linear and quadratic temperature coefficients.

19. The method of claim 14, wherein the partial resistors are selected so that a resistance of at least one of the partial resistors depends on an applied temperature and does not depend on an applied pressure.

* * * * *